United States Patent Office 2,848,015
Patented Aug. 19, 1958

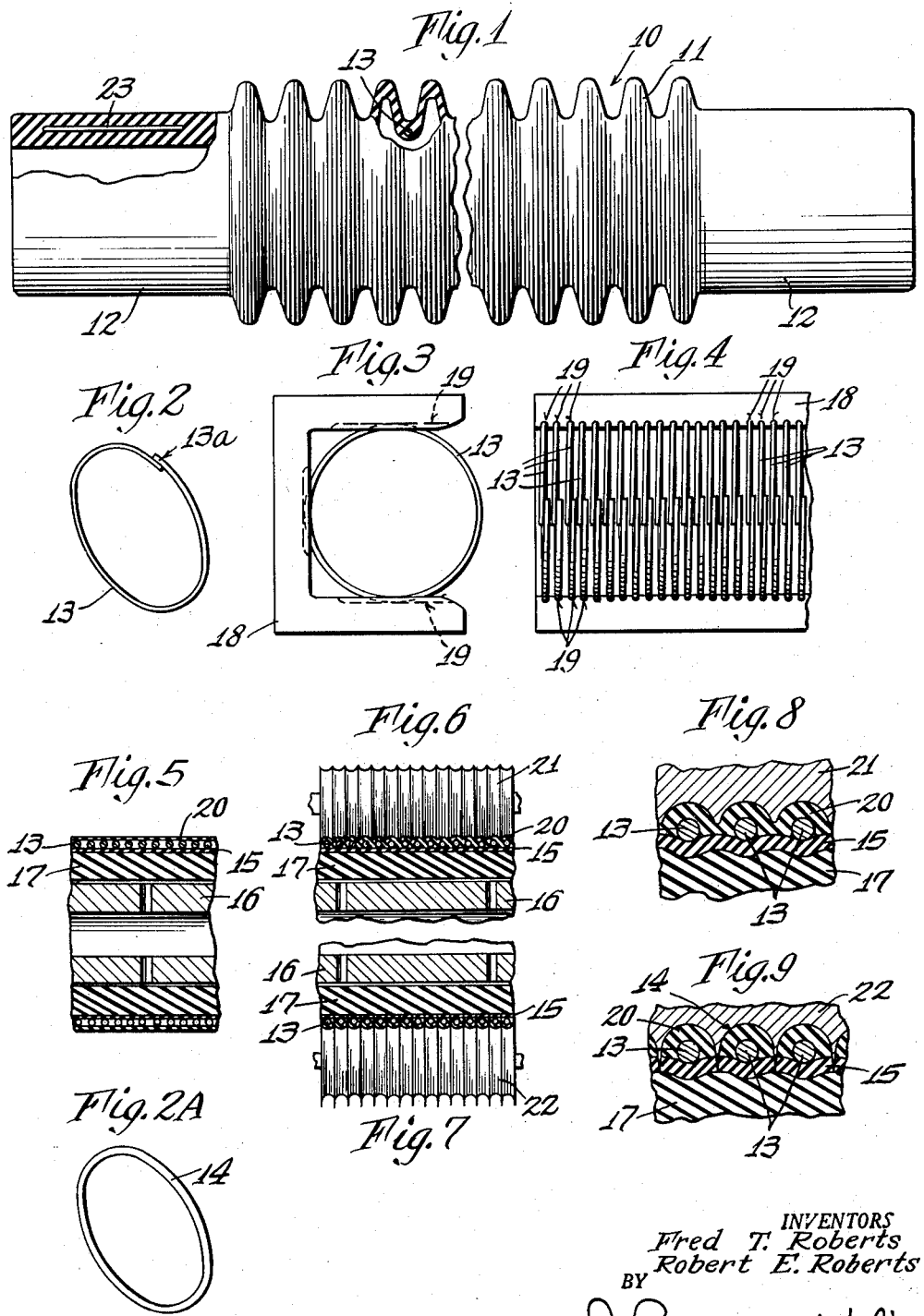

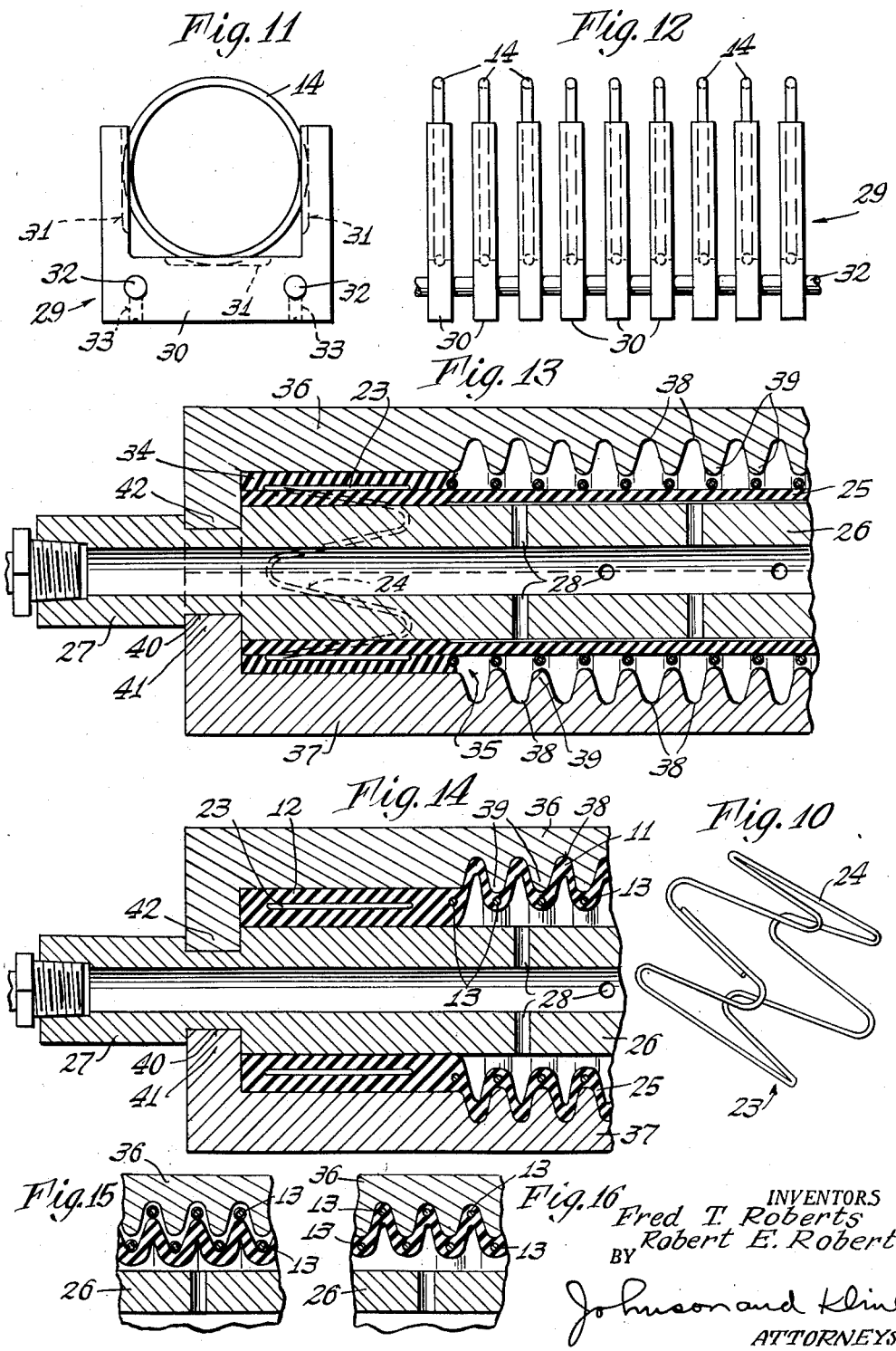

2,848,015

REENFORCED HOSE AND METHOD OF MAKING SAME

Fred T. Roberts and Robert E. Roberts, Wilton, Conn.

Original application December 1, 1955, Serial No. 550,307, now Patent No. 2,780,274, dated February 5, 1957. Divided and this application June 7, 1956, Serial No. 589,893

4 Claims. (Cl. 138—56)

This invention relates to flexible hose and more particularly to a molded flexible hose having a reenforced, annularly corrugated body. This application is a division of my copending application Serial No. 550,307, filed December 1, 1955, now Patent No. 2,780,274, granted Feburary 5, 1957.

Heretofore, it has been the practice to employ relatively stiff, inflexible hose as conduits in cooling systems of internal combustion engines. These have been difficult to install, particularly where the distance between the metal connectors for the hose and which distance is to be spanned by the hose is relatively close since it cannot be readily manipulated into position. Further, the usual engine vibrations, because of the stiffness of the inflexible hose, tend to break off the metal connectors from the radiator or the like. When a spirally reenforced flexible hose has been used, it has overcome to some degree the difficulties of the inflexible hose, yet has presented difficulties in manipulation due to the spiral relation of the reenforcement in the hose which makes it difficult to manipulate in extending and contracting the hose.

The present invention overcomes these difficulties by providing a hose having a body of annular corrugations reenforced so as to withstand the varying pressure conditions to which the hose is subjected and yet is flexible, compressible and extensible to permit it to be readily manipulated and easily installed, even in limited spaces.

This is accomplished by providing the hose of elastomeric material having an annularly corrugated body provided with annular wire reenforcements embedded in the corrugations in predetermined relations to the corrugations and by having a reenforced cylindrical attaching sleeve at each end of the body.

In carrying out the invention, a novel annular reenforcing means are provided in the body and a novel broad, resilient, reenforcing means is provided in the attaching sleeve. The present invention also embraces a novel method of making the hose in which the annular reenforcing means is accurately and readily positioned on the body of the hose and by inflating the hose it is molded and set in its final configuration so as to provide a reenforced bellows type construction.

Other features and advantages of the invention will be apparent from the specification and claims when considered in connection with the drawings in which:

Figure 1 shows the hose of the present invention partly in section.

Fig. 2 is a perspective of a reenforcing coil.

Fig. 2A is a figure of the reenforcing coil of Fig. 2 with the rubber cover in place thereon.

Fig. 3 is an end view of the spacer fixture used in covering the coils with rubber.

Fig. 4 is a front view of Fig. 3.

Fig. 5 is a fragmentary sectional view of the mandrel having the wire covering material and wires in place thereon.

Fig. 6 is a fragmentary view showing the covering material being pressed into covering relation.

Fig. 7 is a fragmentary view showing the slitting of the reenforcing coils.

Fig. 8 is a detailed sectional view of the coils as shown in Fig. 6.

Fig. 9 is a detailed view of the coils as shown in Fig. 7, showing the severing of the coils.

Fig. 10 is a perspective view of a reenforcing means for the attaching portion of the hose.

Fig. 11 is an end view of a spacer utilized in holding the rubber covered coils for inclusion in the hose.

Fig. 12 is a side view of the spacer member.

Fig. 13 shows the mandrel in position in the mold and illustrates the relative position of the parts prior to the molding operation when making a hose with wire reenforcements in the trough of the corrugations.

Fig. 14 is a view similar to Fig. 13 showing the relation of parts after the molding operation.

Fig. 15 is a fragmentary view showing the relation of the parts in the mold when making a hose having reenforcements in the crest and trough of the corrugations.

Fig. 16 is a view similar to Fig. 15 showing the elements after the molding operation.

For the purpose of illustrating the present invention, a relatively short hose, such as is used as a conduit for a cooling system in an internal combuston engine will be shown. This hose comprises a body portion 10 of molded elastomeric material, such as rubber (natural or synthetic) or thermoplastic resins which may be molded under heat and pressure, for example, polyethylene, polyamides, vinyl polymers and copolymers and the like, the particular requirements of the hose determining the composition thereof. The body is annularly corrugated at 11 and has at each end a cylindrical attaching portion 12 which is adapted to be readily slipped over the usual metallic connections to the radiator block and the like, not shown, to form a connection therewith.

In carrying out the present invention, the corrugations are reenforced by an anular wire reenforcement 13. While the reenforcement may be embedded in the surface of the corrugations, it is at present preferred to embed it within the body of the hose so as to provide a smooth inner and outer molded surface on the hose body. The annular reenforcements are positioned in predetermined relation with the corrugations in the body. As herein illustrated, they may be positioned in the trough and/or the crest of the corrugations.

In accordance with the present invention, the annular wire reenforcing members 13 in the body of the hose can be made as a solid ring. However, it is at present preferred to form them as a single coil of spring wire having the ends 13a of the coils overlapped, as shown in Fig. 2, so that this will permit slight expansion of the coil within the elasticity of the material of the body without destroying the reenforcing effect of the coil. While bare wire may be employed in providing the reenforcement, it is at present preferred to provide the reenforcing element with a cover 14, as shown in Fig. 2A, of a similar or compatible elastomeric material as that of the body of the hose so that when the hose is molded and set, the body of the hose and cover become amalgamated and form a unitary body.

While any elastomeric material may be utilized to form the hose, it is herein illustrated as being formed of rubber and the cover for the wire reenforcing members are formed of rubber. When the body is molded, the rubber of the body and the rubber of the cover blend together and when vulcanized form a strong, integral construction as shown in Figs. 1, 14 and 16, securely holding the reenforcements in place.

With the annular reenforcements positioned in each corrugation, it will be seen that the hose presents a true bellows action and can be readily contracted, extended or otherwise manipulated without interference by the reenforcing member as was previously the case wherein the torsion in the helically coiled spring embedded in the hose tended to restrict the ease with which the hose could be manipulated.

While the reenforcing members may be covered in any way, such as by dipping, spraying or the like, in the herein preferred form of the invention the wires are covered by sheet rubber material which is pressed around each of the wires. This is accomplished, as shown in Figs. 3 to 9 wherein a sheet or sleeve of rubber 15 is positioned over an expansible mandrel 16 having an inflatable elastic cover 17 of rubber or the like material. The coils of wire 13 having the desired diameter are mounted in a C-shaped spacer unit 18 having a plurality of grooves 19 uniformly spaced apart. The mandrel is inserted into the coils carried by the spacer and is inflated so as to cause the rubber cover to expand and press the rubber sheet against the internal surfaces of the rings or coils, as shown in Figs. 5 and 8, and to hold the coils in position thereon. Thereafter, a layer 20 of rubber is wrapped around the outer surface of the coils, as shown in Fig. 5. The mandrel is rotated and a grooved presser roller 21 (Fig. 6) is moved into contact with the outer layer of rubber and presses the two layers of rubber together to completely enclose the coils, as shown in Fig. 8. Thereafter, a slitter 22 is moved against the rotating mandrel, as shown in Fig. 7, to slit the rubber between each of the coils, as shown in Fig. 9, and form separate rubber covered rings as shown in Fig. 2A.

Also, in accordance with the present invention, it may be desired to provide the attaching portions 12 of the hose with a resilient reenforcing means. In the preferred form of the invention this comprises a relatively wide band of hard resilient material 23 which extends around the attaching portion and is embedded therein.

While the broad reenforcing means may be made in many ways, it is herein preferred to form it by bending a spring wire 24 in zigzag or sinusoidal relation and wrapping it into an annular member as shown in Fig. 10. When this is embedded in the attaching portion, it will be seen that the wires of the band extend longitudinally of the axis of the hose for a substantial distance along the attaching portion. It is to be understood that if a very broad reenforcing band is required, several wire bands can be positioned side by side with the zigzag portions nested to provide the additional reenforcing area.

The spring wire band is capable of expansion and contraction so that the cylindrical attaching portion can be expanded as it is slipped over the ends of the connector and then will contract and grip the connector. Furthermore, the relatively wide band of reenforcing material in the attaching portion provides a firm base upon which the usual clamping member, not shown, may be positioned so that its clamping force is distributed over a wider area by the wires in the reenforcing member and the clamp is prevented from cutting through the rubber and destroy the connection.

In forming the hose of the present invention, a sleeve of rubber 25 to form the body of the hose is inserted over a hollow mandrel 26 having a nipple 27 at one end adapted to be connected to an air supply and a plurality of ports 28 in its surface whereby the sleeve can be inflated. While the rubber sleeve may be provided with a reenforcement of stockinet adhered to the outer surface thereof when a thin wall hose is required, for the purpose of illustrating the invention a plain rubber sleeve is shown having a thickness sufficient to provide the required wall thickness for the body of the hose. However, the term "body of elastomeric material" as used herein refers to the body with or without the stockinet embedded therein.

With the sleeve in position on the mandrel, the rubber covered reenforcing rings 14 are then put in position thereon. This can be done by manually moving each of the rings to the required location. Preferably, however, the rubber covered reenforcing rings 14 are mounted in a spaced revice 29 shown in Figs. 11 and 12. The unit comprises C-shaped units 30 which have ring-receiving grooves 31 on their inner faces and are mounted on rods 32 and adjusted and arranged as required to provide the desired location of the rings in the hose and are secured in position by set screws 33. The rings thus held are slipped over the sleeve on the mandrel. The rings which are to be located in the trough of the corrugations are slightly larger than the diameter of the rubber sleeve and the sleeve is partially inflated to hold the rings in position as shown in Fig. 13. At the same time, the reenforcing band 23 is inserted over each end of the sleeve and an additional rubber layer 34 is wound around the reenforcing band so as to provide the attaching portion for the hose. The mandrel is then inserted into the cavity 35 of a two-part mold 36, 37, as shown in Fig. 13, which cavity is provided with annular grooves 38, leaving ribs 39 therebetween. The mandrel is properly positioned therein by means of a groove 40 on the mandrel cooperating with flanges 41, 42 on the mold so that the reenforcing members are positioned so as to be located opposite the tops of the ribs forming the grooves in the cavity of the mold so as to be in the trough of the corrugations when the hose is molded. The mandrel is then inflated so as to cause the rubber sleeve to be forced outwardly against the grooves of the mold, as shown in Fig. 14, and thus provide a corrugated body.

The mold can be heated and the mandrel can have the usual air, steam and water lines selectively connected to the nipple thereof. After the body is molded steam can then be injected into the mandrel to cause the rubber to be vulcanized and set into its final form. After the vulcanizing has been completed, cold water can be injected into the mandrel to cool the mandrel after which it is removed from the mold.

When the reenforcement is to be located in the crest of the corrugations, the same procedure is followed except that the rings 14 will have a diameter slightly less than that of the crest of corrugations and they will be positioned so that they lie in the grooves 38 in the mold. It will be seen, therefore, that by selecting rings of the proper diameter and locating them in the required position with respect to the grooves in the mold any desired reenforcement of the hose can be achieved.

In cases where the reenforcement is to be located both in the trough and crest of the corrugated body, the procedure is carried out as above, first locating the reenforcing rings for the troughs on the mandrel and gripping them to hold them in position. Thereafter, a second set of rings having a diameter slightly less than the crest of the corrugations is positioned on the sleeve by the positioning means so as to lie between the first set. The sleeve is further expanded to hold these rings of the second set in position. The mandrel is then placed in the mold, as shown in Fig. 15, with the rings in predetermined relation to the grooves in the mold so as to locate the rings in the crests and troughs of the body. The sleeve is further inflated to force the rubber against the walls of the cavity and mold the body having the reenforcements embedded in the crest and trough of the corrugations as shown in Fig. 16. The hose is then vulcanized, the mandrel cooled and removed from the mold after which the hose is removed from the mandrel.

While the molding of a single length of hose is described herein, it is to be understood that a plurality of hose sections can be simultaneously made by the use of an elongate mandrel and multiple, aligned cavities in the mold and the sections thereafter severed into single hose lengths.

Variations and modifications may be made within the scope of the claims and portions of the improvements may be used without others.

We claim:

1. A mold formed, reenforced flexible hose comprising an annularly corrugated body of elastomeric material having separate, annular reenforcing means embedded in the body in a predetermined position with respect to each corrugation, said reenforcing means comprising single coils of resilient wire, each having the ends thereof overlapped.

2. A mold formed, reenforced flexible hose comprising an annularly corrugated body of elastomeric material having separate, annular reenforcing means embedded in the body in a predetermined position with respect to each corrugation, said reenforcing means comprising single coils of resilient wire having the ends disconnected and in overlapped relation, and a cover of elastomeric material enclosing the coil.

3. A reenforced flexible hose comprising a molded, annularly corrugated body of elastomeric material having a ring of resilient wire embedded in the body in each corrugation, and a cylindrical, resilient attaching portion at each end of the corrugated body and adapted to be slipped over a connector, said attaching portion having a broad, resilient band of spring wire embedded therein to extend for substantially the length thereof, said band being independent of the wire rings and being expansible and contractible to permit the attaching portion to be expanded to slip over the connector and to contract and grip the connector.

4. A reenforced flexible hose comprising a molded, annularly corrugated body of elastomeric material having at least one ring of resilient wire embedded in the body in each corrugation, and a clamp-receiving, cylindrical, resilient attaching sleeve portion secured at each end of the corrugated body and adapted to be slipped over a connector, said sleeve portion having a broad band of zigzag wire extending therearound and embedded therein, said band being of a width to extend for a major portion of the length of the sleeve portion to underlie the clamp-receiving portion whereby the applied clamping pressure is distributed over a wider area to produce a more secure seal and prevent cutting through of the sleeve portion by the clamp, said band being independent of the wire rings and being expansible and contractible to permit the sleeve portion to be expanded to slip over the connector and to contract and grip the connector.

References Cited in the file of this patent

UNITED STATES PATENTS

| | | |
|---|---|---|
| 558,342 | Beebe | Apr. 14, 1891 |
| 1,324,850 | Roberts | Dec. 16, 1919 |
| 1,844,148 | Dunwoodie | Feb. 9, 1932 |
| 2,167,865 | Beecher | Aug. 1, 1939 |
| 2,299,520 | Yant | Oct. 20, 1942 |
| 2,396,059 | Roberts | Mar. 5, 1946 |
| 2,441,131 | Blackman et al. | May 11, 1948 |
| 2,490,513 | Dreyer | Dec. 6, 1949 |
| 2,715,914 | Roberts | Aug. 23, 1955 |

FOREIGN PATENTS

| | | |
|---|---|---|
| 328,806 | Germany | Jan. 31, 1917 |
| 792,388 | France | Dec. 30, 1935 |

UNITED STATES PATENT OFFICE
CERTIFICATE OF CORRECTION

Patent No. 2,848,015                                          August 19, 1958

Fred T. Roberts et al.

It is hereby certified that error appears in the printed specification of the above numbered patent requiring correction and that the said Letters Patent should read as corrected below.

Column 1, line 20, for "Debunary" read -- February --; column 2, line 25, for "combuston" read -- combustion --; line 38, for "anular" read -- annular --; column 3, lines 57 and 58, for "destroy" read -- destroying --; column 4, line 3, for "spaced revice" read -- spacer device --.

Signed and sealed this 21st day of October 1958.

(SEAL)
Attest:

KARL H. AXLINE                                                 ROBERT C. WATSON
Attesting Officer                                         Commissioner of Patents